United States Patent [19]

Tominaga

[11] Patent Number: 4,763,607

[45] Date of Patent: Aug. 16, 1988

[54] DEVICE FOR PREVENTING THE PET ANIMAL KEPT IN THE CAGE FROM ESCAPING THEREFROM

[75] Inventor: Kazutoshi Tominaga, Higashi Osaka, Japan

[73] Assignee: Kabushiki Kaisha Tominaga Jyushikogyosho, Higashi Osakashi, Japan

[21] Appl. No.: 881,844

[22] Filed: Jul. 3, 1986

[51] Int. Cl.$^4$ .............................................. A01K 1/02
[52] U.S. Cl. ...................................... 119/17; 119/19; 292/DIG. 28
[58] Field of Search ...................... 119/17, 18; 53/287, 53/292; 220/315; 292/DIG. 28

[56] References Cited

U.S. PATENT DOCUMENTS

| | | | |
|---|---|---|---|
| 3,059,952 | 10/1962 | Wittman et al. | 292/DIG. 28 X |
| 3,791,347 | 2/1974 | Lovell | 119/17 X |
| 3,897,751 | 8/1975 | Gullino et al. | 119/18 X |
| 4,640,228 | 2/1987 | Sedlacek et al. | 119/17 X |

FOREIGN PATENT DOCUMENTS 326377  4/1929  United Kingdom ....... 292/DIG. 28

Primary Examiner—Carl D. Friedman
Assistant Examiner—Creighton Smith
Attorney, Agent, or Firm—Collard, Roe & Galgano

[57] ABSTRACT

A pet animal cage for household use, the cage comprising a device for preventing the animal therefrom, the device comprising a sucker for attachment to the cage body, and a connecting arm for connection between the cage lid and the sucker, thereby securing the lid to the cage body without the possibility of removal by the animal inside.

1 Claim, 3 Drawing Sheets

DEVICE FOR PREVENTING THE PET ANIMAL KEPT IN THE CAGE FROM ESCAPING THEREFROM

BACKGROUND OF THE INVENTION

1. Field of the Invention

The present invention relates generally to a pet animal cage for houshold use, and more particularly to a device for preventing the animal kept in the cage from escaping therefrom, wherein the animals includes a hamster, snake, mouse and lizard. The device will be hereinafter referred to merely as the device.

2. Description of the Prior Art

In order to prevent the animal kept in the cage from escaping therefrom, the cage is covered by a lid. However the pet animal tend to push the lid from inside so as to produce a gap allowing itself to pass through. To prevent it the lid is tied to the body of the cage. Alternatively a fairly heavy weight, such as stone or a lead ball, is placed on the lid. This spoils the appearance of the cage, and is unfit to the interior atmosphere of the room. However the weighted lid is often moved by the animal kept in the cage, and the animal succeeds in escaping from the cage.

OBJECTS AND SUMMARY OF THE INVENTION

The present invention aims at solving the problems pointed out with respect to the conventional pet animal cages, and has for its object to provide an improved pet animal cage having a device for preventing the animal from escaping from the cage.

Other objects and advantages of the present invention will become apparant from the detailed description given hereinafter; it should be understood, however, that the detailed description and specific embodiment are given by way of illustration only, since various changes and modifications within the spirit and scope of the invention will become apparent to those skilled in the art from this detailed description and drawings.

According to the prevent invention there is a provided a pet animal cage for household use; the cage comprising:

a body constituting a lower part of the cage;

a lid covering the body of the cage; and means for securing the lid to the body, the means comprising a sucker for attachment to the body, and a connecting arm for connecting between the sucker and the lid.

DETAILED DESCRIPTION OF THE INVENTION

Referring to FIGS. 1 to 4 the device includes a sucker 1 and a connecting arm 2. A cage includes a body (A) and a lid (B).

The sucker 1 is attached to an outside (a) of the body (A). The sucker 1 is preferably made of natural rubber or plastics.

Figure 1:
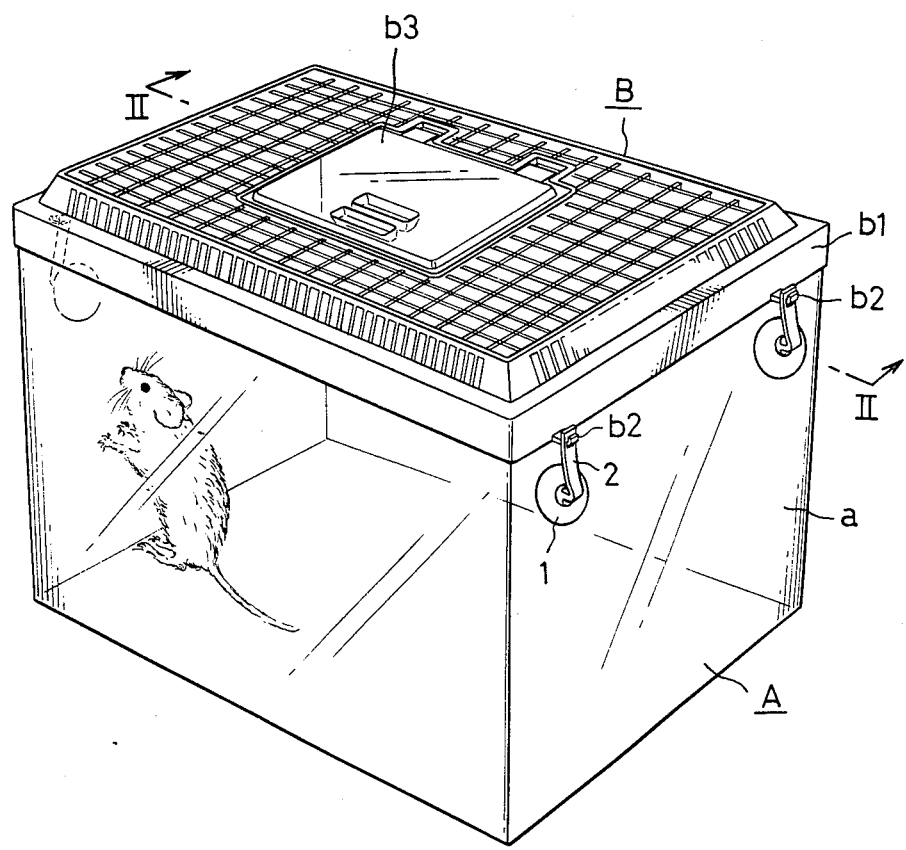
FIG. 1 is a perspective view showing a cage incorporating the device embodying the present invention.
Figure 2:
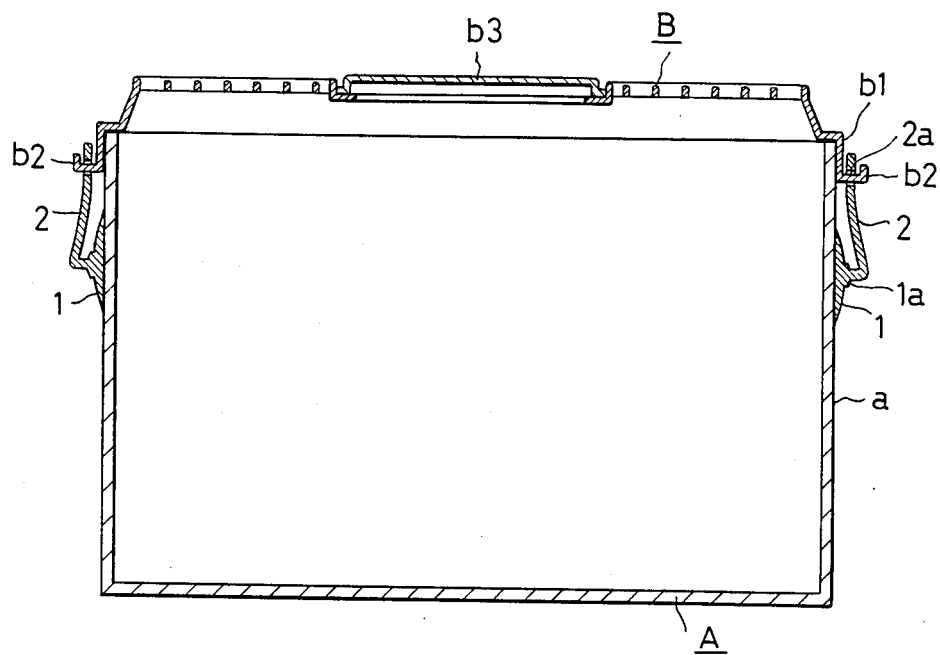
FIG. 2 is a vertical cross-section through the cage shown in FIG. 1.
Figure 3:
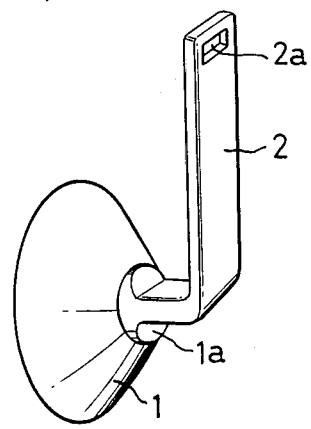
FIG. 3 is a perspective view on an enlarged scale of the device shown in FIG. 1.
Figure 4:
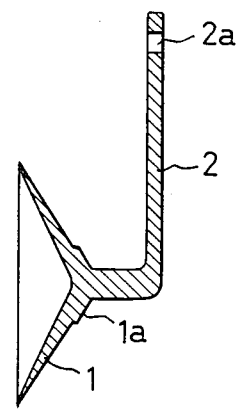
FIG. 4 is a vertical cross-section through the device of FIG. 3.
Figure 5:
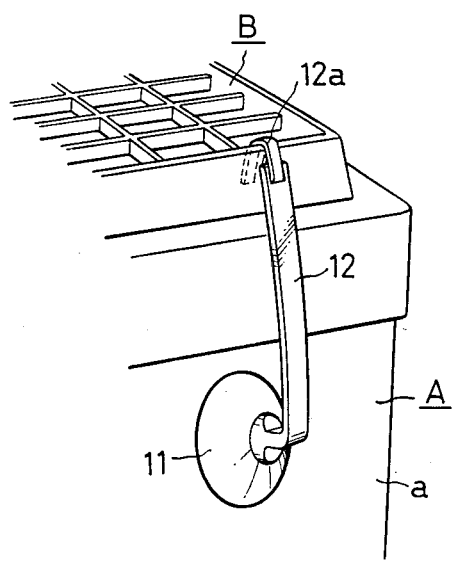
FIG. 5 is a perspective view showing the device in operation.

The connecting arm 2 has an L-letter cross-section as best shown in FIG. 4, wherein one end thereof is connected to the top portion 1a of the sucker 1 and the other end thereof is provided with a hole 2a adapted to receive a projection b2 extending from the lid (B). The projection b2 takes an inversed L-shaped form wherein the short leg is engaged in the hole 2a. In this way the sucker 1 is attached to the lid (B). The connecting arm 2 is also made of natural rubber or plastic. Preferably the sucker 1 and the connecting arm 2 are made in one piece. The device is elastic as a whole; therefore, the lid (B) is tightly placed on the body (A). In the illustrated embodiment four devices are used. However the number is not limited to it but it is preferred that at least one device is used on each of the opposite sides.

The illustrated embodiment has a lid of net structure in which a closable opening b3 is provided.

Figure 6:
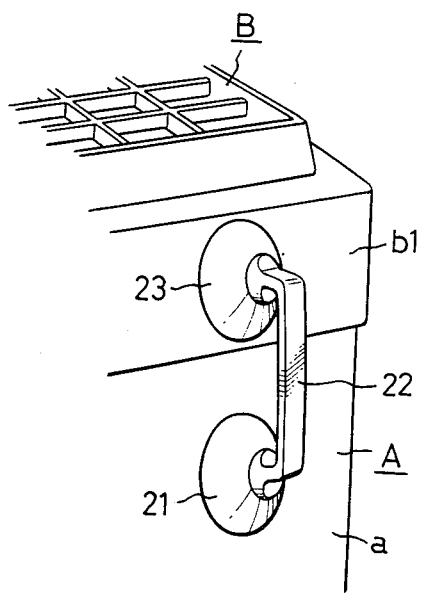
FIG. 6 is a perspective view showing a modified version of the device.

FIG. 6 shows a modified version of the device which includes a pair of suckers 21 and 23 with a connecting arm 22 interposed therebetween. The sucker 21 is attached to the side wall of the body (A), and the sucker 23 is attached to the peripheral rim b1 of the lid (B).

Figure 7:
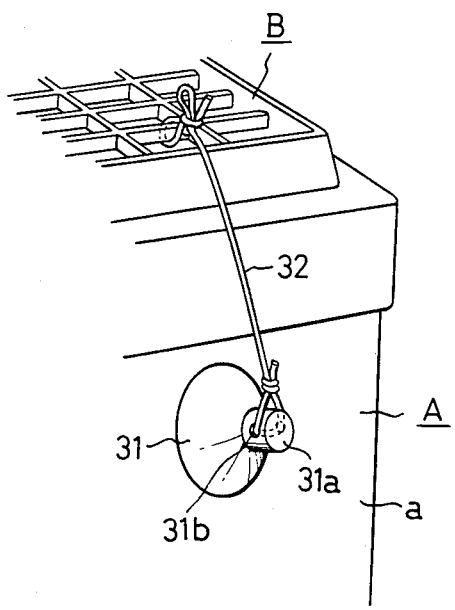
FIG. 7 is a perspective view showing a further modified version of the device.

FIG. 7 shows a further modified version of the device in which a sucker 31 is provided with a string 32 in place of the connecting arm. One end of the string 32 is tied to the lid (B). The string 32 is made of metal wire, strong thread or any other elastic material. The other end of the string 32 is tied to a top portion 31a of the sucker 31 through a hole 31b.

As evident from the foregoing description the lid is tightly but releasably fixed to the body of the cage without spoiling the appearance of the cage. In this way the animal kept in the cage is prevented from escaping therefrom even when the animal is a relatively wise species, such as a mouse or hamster. If the cage is subjected to vibration during transportation the lid is safely secured to the body of the cage.

It is preferred that the connecting arm is constantly fixed to the lid (B) as a unit, and that the sucker alone is attached to or detached from, the body of the cage.

What is claimed is:

1. A pet animal cage for household use, the case comprising:

a body forming a lower part of the cage and having an open top;

a removable lid covering the open top of the body of the cage;

at least two hook means oppositely disposed on said lid; and means for securing the lid to the body comprising in association with each respective hook means a suction cup and a connecting arm integrally connected therewith formed of an elastic material from the group consisting of rubber and deformable plastic, the suction cup being adapted for attachment to the body and the connecting arm being connected to the suction cup at one end and provided with a hole at the other end so that the hook means on said lid is engageable in said hole, whereby the suction cup can be so positioned on said body that the elasticity of said connecting arm when the hole thereof is engaged with said hook means tightly secures said lid to cover the open top of said body.

* * * * *